United States Patent
Hachisu

[11] Patent Number: 5,136,928
[45] Date of Patent: Aug. 11, 1992

[54] SERVICE MACHINE STOPPING APPARATUS FOR MIDGET ROTARY POWER SHOVEL

[75] Inventor: Yasuyuki Hachisu, Saitama, Japan

[73] Assignees: Kabushiki Kaisha Komatsu Seisakusho; Komatsu Zenoa Kabushiki Kaisha, both of Tokyo, Japan

[21] Appl. No.: 582,182
[22] PCT Filed: Jan. 22, 1990
[86] PCT No.: PCT/JP90/00070
  § 371 Date: Sep. 21, 1990
  § 102(e) Date: Sep. 21, 1990
[87] PCT Pub. No.: WO90/08233
  PCT Pub. Date: Jul. 26, 1990

[30] Foreign Application Priority Data
  Jan. 23, 1989 [JP] Japan ................... 1-5490[U]

[51] Int. Cl.⁵ ........................................ F15B 15/20
[52] U.S. Cl. ........................................ 91/392; 91/448; 91/459
[58] Field of Search ............ 91/361, 392, 448, 459; 60/368

[56] References Cited

U.S. PATENT DOCUMENTS

| | | | |
|---|---|---|---|
| 4,646,620 | 3/1987 | Buchl | 91/361 |
| 4,655,039 | 4/1987 | McCabe | 91/459 |

FOREIGN PATENT DOCUMENTS

| | | |
|---|---|---|
| 160437 | 9/1983 | Japan . |
| 53922 | 3/1986 | Japan . |
| 216938 | 9/1986 | Japan . |

*Primary Examiner*—Edward K. Look
*Assistant Examiner*—F. Daniel Lopez
*Attorney, Agent, or Firm*—Flynn, Thiel, Boutell & Tanis

[57] ABSTRACT

A service machine stopping apparatus is provided for a midget rotary power shovel wherein an upper rotary member is rotatably disposed on a lower travelling member capable of self-travelling and a service machine is mounted onto the upper rotary member. The stopping apparatus comprises operation valves for controlling each of a boom cylinder, an arm cylinder and an offset cylinder. Solenoid valves disposed in tubing connecting each operation valve with each cylinder are switched from a communication position to a cut-off position when the service machine reaches a critical region of space, and check valves for check the flow in the cylinder direction when in the cut-off position.

3 Claims, 4 Drawing Sheets

5,136,928

SERVICE MACHINE STOPPING APPARATUS FOR MIDGET ROTARY POWER SHOVEL

TECHNICAL FIELD

The present invention relates to a service machine stopping apparatus for a midget rotary power shovel capable of rotating in a small space, particularly to the service machine stopping apparatus capable of securing a stable and wide operation range.

BACKGROUND OF THE ART

A prior art midget rotary power shovel comprises, as illustrated in FIG. 2, an upper rotary member 2 rotatably disposed on a lower travelling body member 1 capable of self-travelling and a service machine 3 mounted onto the upper turning body 2.

The service machine 3 comprises a boom 5 capable of moving and lowering by a boom cylinder 4, an arm 7 mounted on a tip end of the boom 5 and rotatable by an arm cylinder 6 and a bucket 9 capable of being turned by a bucket cylinder 8. An offset mechanism 10 is provided on the boom 5 so that the arm 7 and the bucket 9 are movable laterally of the power shovel as illustrated in an imaginary line of FIG. 3.

If the arm 7 and the bucket 9 are turned with the service machine 3 being upright as illustrated in FIG. 2, a tip end of the backet 9 is liable to interfere with an operation room, etc. in an interference region as hatched in FIGS. 2 and 3.

Accordingly, there have been conventionally employed, as illustrated in FIG. 4, a solenoid valve 14 positioned between a cylinder 12 interlocked with an operation lever 11 and a control pump 13, a controller 15 for issuing a signal when the bucket 9 reaches a critical region ahead of the interference region to thereby open the solenoid valve 14 and forcibly return the solenoid valve 14 to a neutral position so that the service machine 3 is stopped.

However, inasmuch as the prior art service machine stopping apparatus has a structure to return a spool of the solenoid valve 14 to a neutral position by a return spring 16 provided inside the cylinder 12, there is a likelihood that the temperature of the working fluid is liable to affect the return speed of the return spring 16 or the engine speed or an operation method can affect the speed of the service machine. Hence, there is a drawback in that the stop time of the service machine is varied so that the stop position of the service machine is not stable to thereby vary the operation range.

Accordingly, the present invention is to provide a service machine stopping apparatus capable of solving the problem of the prior art service machine, reducing the delay of the stop time of the service machine to thereby ensure the stable and wide operation range.

DISCLOSURE OF THE INVENTION

The present invention provides a service machine stopping apparatus for a midget rotary power shovel wherein an upper rotary member is rotatably disposed on a lower travelling member capable of self-travelling and a service machine is mounted onto the upper rotary member, in which the service machine stopping apparatus comprises operation valves each for controlling each of a boom cylinder, an arm cylinder and an offset cylinder, a solenoid valve which is disposed in tubings connecting each operation valve with each cylinder and is switched from a communication position to a cut-off position when the service machine reaches a critical region ahead of an interference region and a check valve for checking the flow in the cylinder direction when in the cut-off position.

With the arrangement set forth above, when the service machine reaches the critical region ahead of the interference region, it is stopped instantaneously and interference of the service machine can be prevented reliably.

As a result of the solenoid valve being assembled directly in the tubing communicating with the cylinder (1), the response speed of the solenoid valve acts as a time lag occurring at the stop of the service machine, (2) the critical zone can be made smaller than that of the prior art apparatus and (3) the operation range can be increased drastically.

BEST MODE FOR CARRYING OUT THE INVENTION

Figure 1:
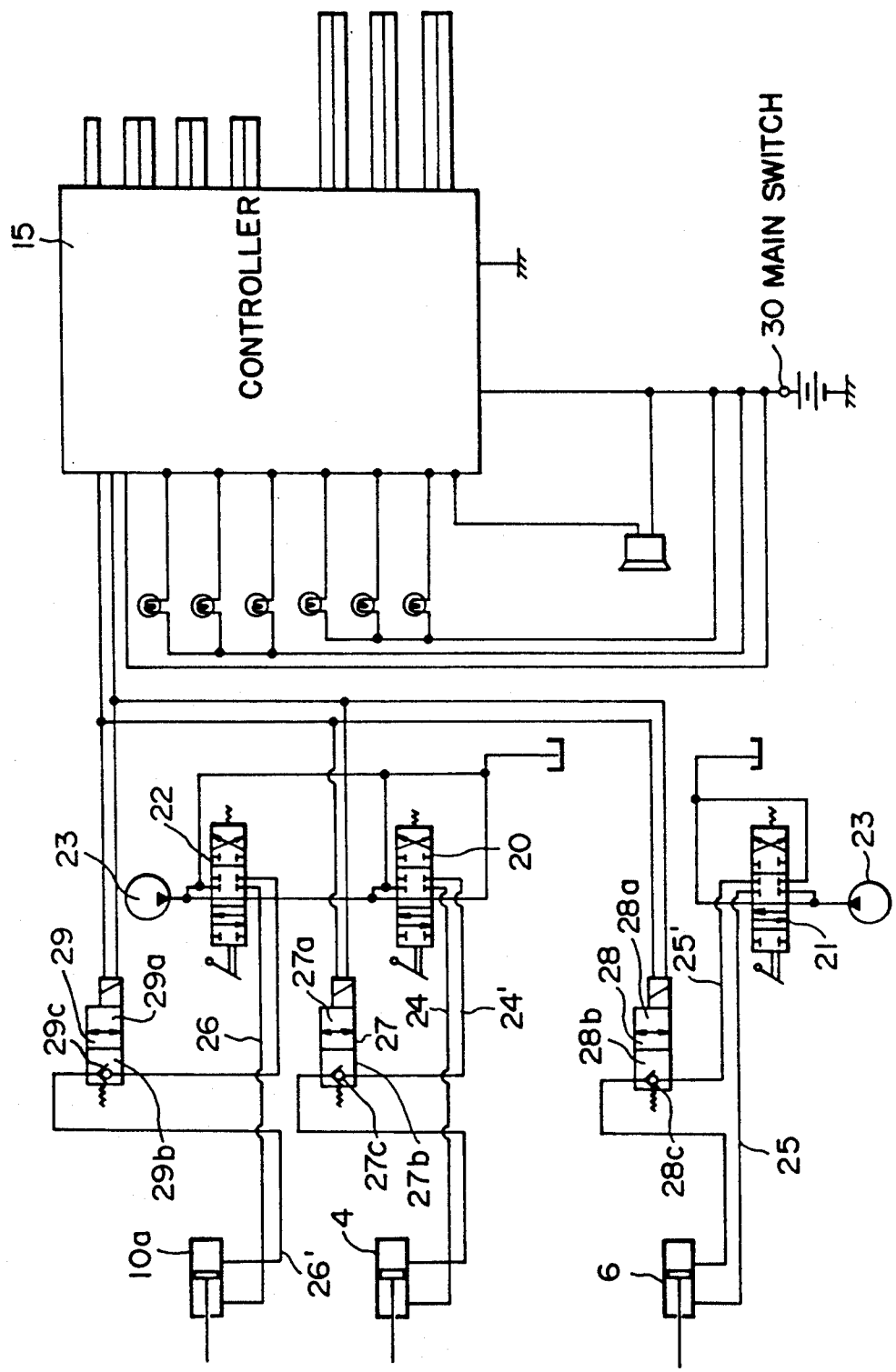
FIG. 1 is a circuit diagram of a service machine stopping apparatus according to an embodiment of the present invention.
Figure 2:
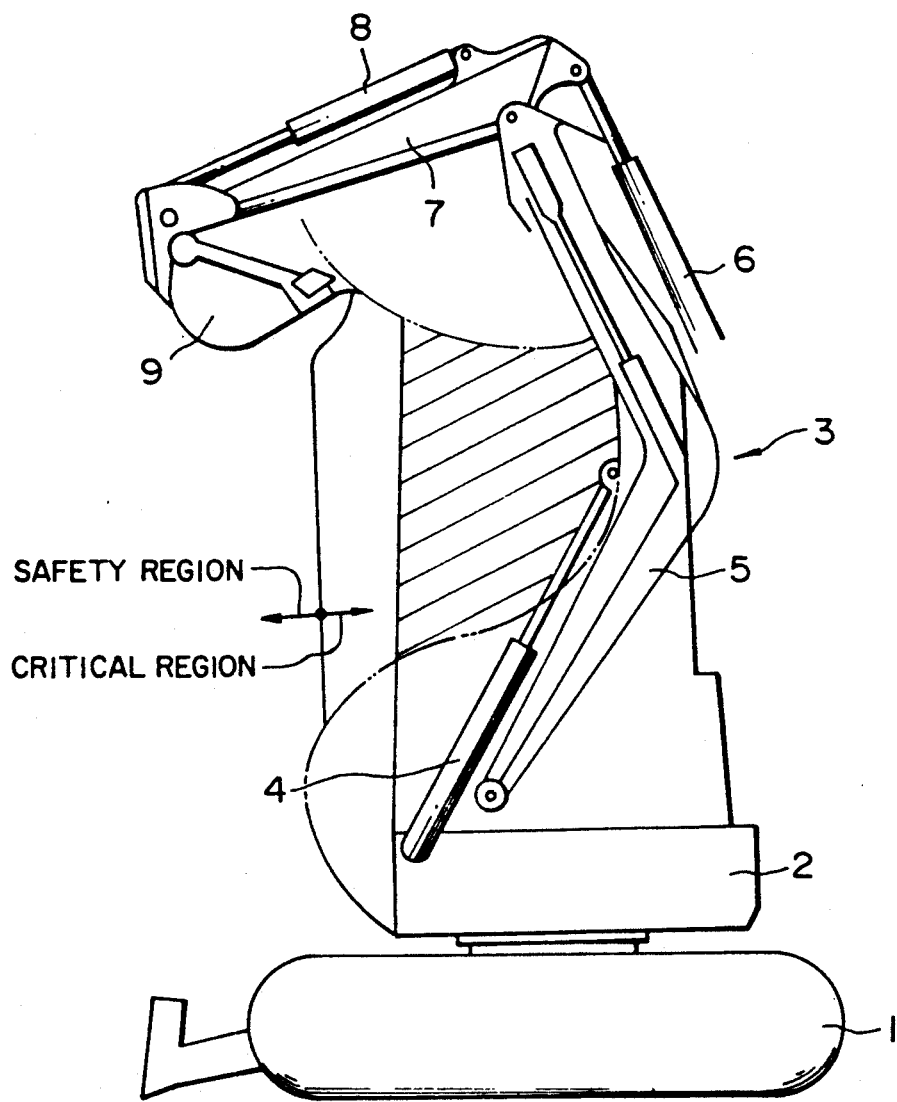
FIG. 2 is a side elevational view of a prior art midget rotary power shovel.
Figure 3:
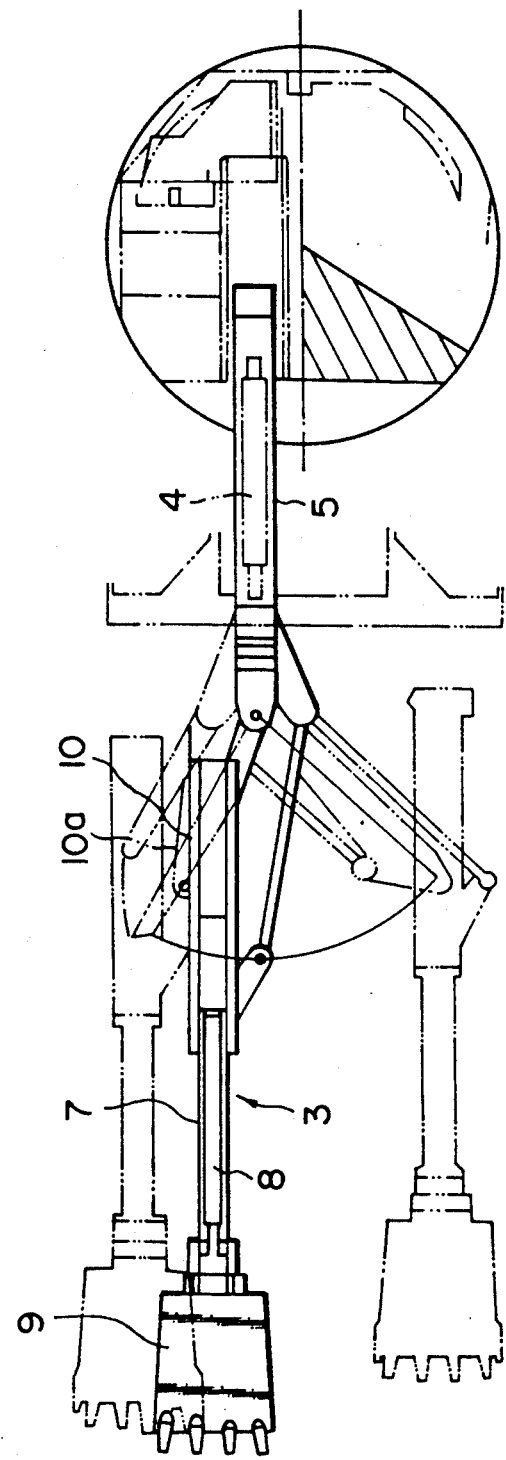
FIG. 3 is a plan view of FIG. 2
Figure 4:
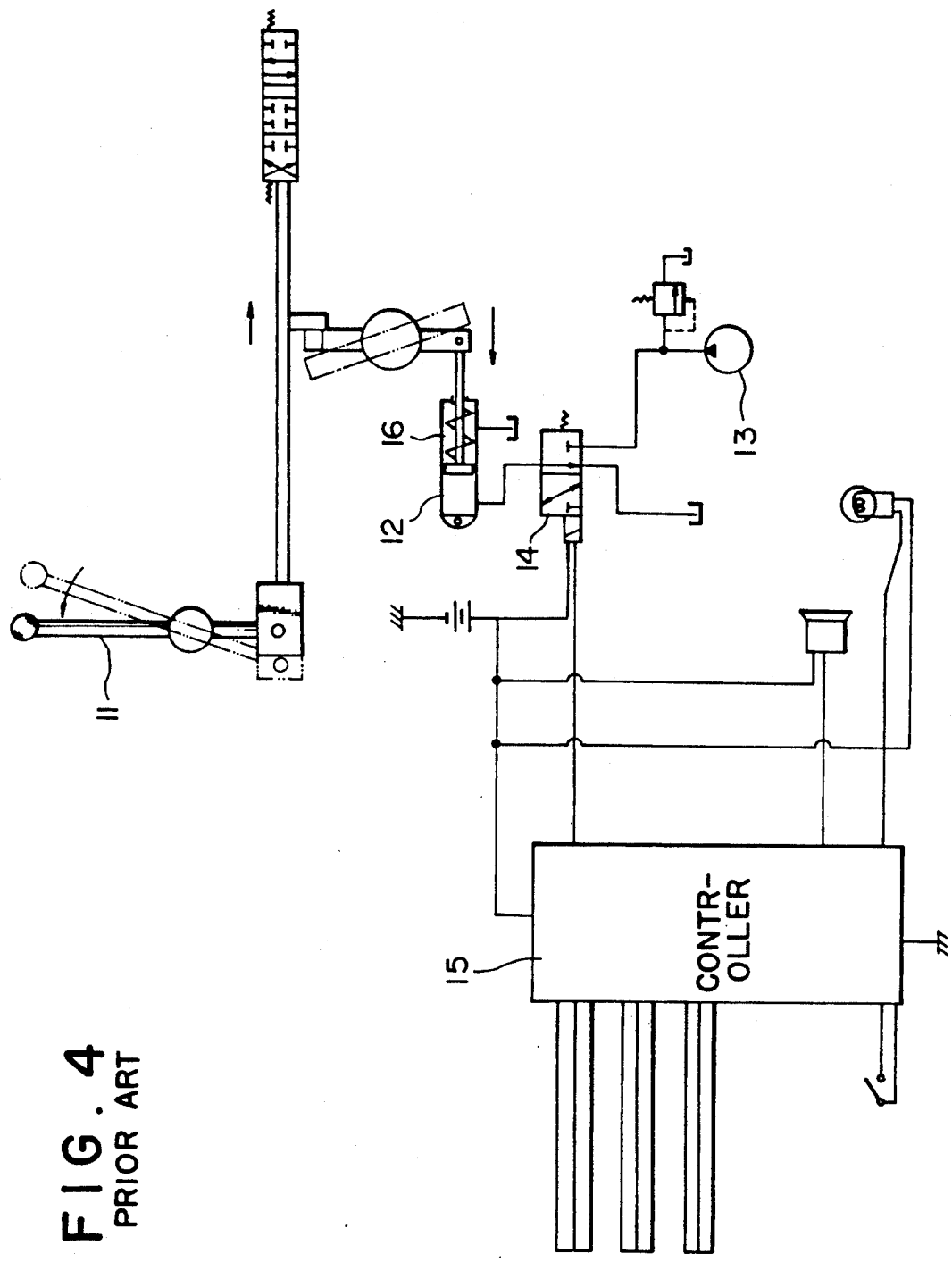
FIG. 4 is a circuit diagram of FIG. 2.

An embodiment of the present invention will be described with reference to FIG. 1. Arrangement of each component of the midget rotary power shovel is the same as that of the prior art as illustrated in FIGS. 2 and 3, hence the embodiment will be described with reference to these figures by designating the same numerals as the prior art.

Fluid under pressure is supplied from a service machine pump 23 to the boom cylinder 4, the arm cylinder 6 and an offset cylinder 10a of the offset mechanism 10 respectively constituting each component of the service machine 3 via operation valves 20, 21, 22 provided for each of the cylinders 4, 6, 10a. There are provided solenoid valves 27, 28, 29 which are disposed midway along the tubings 24', 25', 26' connecting each of the operation valves 20, 21, 22 with each of the cylinders 4, 6, 10a and communicating with bottom sides of the cylinders 4, 6, 10a and the operation valves 20, 21, 22.

The solenoid valves 27, 28, 29 have respectively such structures that they are switched to communication positions 27a, 28a, 29a when energized or cut-off positions 27b, 28b, 29b when deenergized. There are provided check valves 27c, 28c, 29c in the cut-off positions for allowing fluid under pressure to be supplied from the bottom sides of the cylinders 4, 6, 10a to only the operation valves 20, 21, 22.

The solenoid valves 27, 28, 29 have such structures that they are energized upon reception of a signal issued by the controller under operation and deenergized when the tip end of the bucket reaches the interference region.

An operation will be described hereunder.

A main switch 30 provided at the controller 15 is turned on to thereby stop working operation so that the solenoid valves 27, 28, 29 are switched to the communication positions 27a, 28a, 29a.

Consequently, fluid under pressure is supplied to each of the cylinders 4, 6, 10a of the service machine 3 by operating the operation valves 20, 21, 22 so that a digging operation, etc. will be carried out with use of the boom 5, the arm 7, the bucket 9 and the offset mechanism 10.

When the tip end of the bucket 9 under operation reached the critical region ahead of the interference region (hatched portion in FIGS. 2 and 3), the controller 15 detects that the tip end of the bucket 9 reaches the critical region to thereby open the solenoid valves 27, 28, 29 so that the check valves 27c, 28c, 29c check the flow in the bottom sides of the cylinders 4, 6, 10a.

Accordingly, the raising operation of the boom 5, the digging operation of the arm 7 or the offset operation for the arm 7 and the bucket 9 by the offset mechanism 10 is automatically stopped.

Whereupon, when the operation valves 20, 21, 22 are operated from this state to effect lowering operation of the boom 5, dumping operation of the arm 7 or offset operation by the offset mechanism 10, fluid under pressure at the bottom side of each cylinder 4, 6, 10a flows through the check valves 27c, 28c, 29c and the operation valves 20, 21, 22 and drains into a fluid tank. As a result, the service machine 3 returns to a safety region from the critical region ahead of the interference region.

The solenoid valves 27, 28, 29 are energized upon reception of the signal from the controller 15 so that the solenoid valves 27, 28, 29 are switched to the communication positions 27a, 28a, 29a whereby the power shovel can restart the operation in the safety region.

Although the solenoid valves 27, 28, 29 are disposed in the tubings 24', 25', 26' respectively communicating with bottom sides of each of the cylinders 4, 6, 10a according to the embodiment set forth above, the solenoid valves 27, 28, 29 may be of course disposed in the tubings 24, 25, 26 communicating with the cylinder rod sides.

CAPABILITY OF EXPLOITATION IN INDUSTRY

As mentioned above, according to the present invention, the solenold valves are disposed in tubings for connecting each cylinder mounted on the service machine with each operation valve for controlling each cylinder, the solenoid valves are switched from communication positions to cut-off positions when the service machine reaches the critical region ahead of the interference region, and check valves are provided at the cut-off positions for checking the flow in the cylinder direction. Therefore, when the service machine reaches the critical zone ahead of the interference region, it is stopped instantaneously and interference of the service machine can be prevented reliably.

Furthermore, as a result of the solenoid valve being assembled directly in the tubing communicating with the cylinder, (1) the response speed of the solenoid valve acts as a time lag occurring at the stop of the service machine, (2) the critical zone can be made smaller than that of the prior art apparatus and (3) the operation range can be increased drastically.

Accordingly, the present invention provides the service machine stopping apparatus capable of reducing the delay of the stop time of the service machine to thereby ensure the stable and wide working range.

I claim:

1. In a movable service machine for a rotary power shovel having an upper rotary member rotatably disposed on a lower travelling member capable of self-travelling, said service machine being mountable onto the upper rotary member, said service machine including a boom cylinder, an arm cylinder, an offset cylinder and a stopping apparatus for preventing the service machine from entering a predetermined interference region of space, the improvement wherein said stopping apparatus includes operation valves for controlling the respective cylinders, tubings connecting said operation valves to the respective cylinders, solenoid valves disposed respectively in said tubings, the solenoid valves being switched from communication positions to cut-off positions when the service machine reaches a critical region of space enroute toward said interference region, and check valves for checking fluid flow in the cylinder direction when the respective solenoid valves are in the cut-off position.

2. An apparatus according to claim 1, wherein one of said tubings communicates with a bottom side of the respective cylinder.

3. In a rotary power shovel including an upper rotary member rotatably supported on a lower travelling member capable of locomotion, and a movable service machine mounted on said upper rotary member, said service machine including a boom cylinder, an arm cylinder, an offset cylinder and a stopping apparatus for preventing the service machine from entering a predetermined interference region of space, the improvement wherein said stopping apparatus includes operation valves for controlling the respective cylinders, tubing connecting said operation valves to the respective cylinders, solenoid valves disposed respectively in said tubings, the solenoid valves being switched from communication positions to cut-off positions when the service machine reaches a critical region of space enroute toward said interference region, and check valves for checking fluid flow in the cylinder direction when the respective solenoid valves are in the cut-off position.

* * * * *